US008972558B1

(12) United States Patent
Horton

(10) Patent No.: US 8,972,558 B1
(45) Date of Patent: Mar. 3, 2015

(54) LIGHTWEIGHT POLLING TECHNIQUE

(75) Inventor: Gary Horton, Erie, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 254 days.

(21) Appl. No.: 13/585,651

(22) Filed: Aug. 14, 2012

(51) Int. Cl.
*G06F 15/173* (2006.01)

(52) U.S. Cl.
USPC ............................ 709/223; 709/203; 709/217

(58) Field of Classification Search
USPC .......................... 709/203, 217, 219, 223, 224
See application file for complete search history.

(56) References Cited

U.S. PATENT DOCUMENTS

| | | | |
|---|---|---|---|
| 7,185,098 B2 * | 2/2007 | Wang et al. ................... | 709/228 |
| 7,233,940 B2 * | 6/2007 | Bamberger et al. ................. | 1/1 |
| 7,287,077 B2 * | 10/2007 | Haugh et al. ................... | 709/225 |
| 7,756,797 B2 * | 7/2010 | Icenoggle ....................... | 706/12 |
| 8,037,153 B2 * | 10/2011 | Montero ........................ | 709/217 |
| 2002/0178394 A1 * | 11/2002 | Bamberger et al. ............... | 714/1 |
| 2003/0056217 A1 | 3/2003 | Brooks | |
| 2005/0044227 A1 * | 2/2005 | Haugh et al. .................... | 709/226 |
| 2005/0050213 A1 * | 3/2005 | Clough et al. ................. | 709/229 |
| 2006/0130107 A1 * | 6/2006 | Gonder et al. ................. | 725/110 |
| 2007/0083788 A1 * | 4/2007 | Johnson et al. ................... | 714/1 |
| 2007/0217436 A1 | 9/2007 | Markley et al. | |
| 2008/0320026 A1 * | 12/2008 | Linder .......................... | 707/102 |
| 2009/0006559 A1 * | 1/2009 | Bhogal et al. ................. | 709/206 |
| 2009/0248794 A1 | 10/2009 | Helms | |
| 2010/0100845 A1 * | 4/2010 | Khan et al. ..................... | 715/810 |
| 2010/0250652 A1 * | 9/2010 | Suzuki ......................... | 709/203 |
| 2010/0251269 A1 * | 9/2010 | Remmert ...................... | 719/328 |
| 2010/0313236 A1 | 12/2010 | Straub | |
| 2013/0191517 A1 * | 7/2013 | Ling et al. ...................... | 709/220 |

OTHER PUBLICATIONS

Anon., Wikipedia, "Publish-subscribe pattern," downloaded from http://en.wikipedia.org/wiki/Publish-subscribe on Apr. 23, 2012.
Anon., Wikipedia, "Java Message Service," downloaded from http://en.wikipedia.org/wiki/Java_Message_Service on Apr. 23, 2012.
Anon., Wikipedia, "Comet (programming)," downloaded from http://en.wikipedia.org/wiki/Comet_(programming) on Apr. 23, 2012.
Anon., Wikipedia, "Polling (computer science)," downloaded from http://en.wikipedia.org/wiki/Polling_(computer_science) on Apr. 23, 2012.

* cited by examiner

*Primary Examiner* — Lashonda Jacobs
(74) *Attorney, Agent, or Firm* — Otterstedt, Ellenbogen & Kammer, LLP

(57) ABSTRACT

At a network layer of a physical server, during a time when updated information about a topic is unavailable, a first polling request for information about the topic is obtained from a client. The first polling request is directed to a particular port. The first polling request is responded to with a connection refused message, from the network layer of the physical server. In response to updated information about the topic becoming available, a topic server is launched on the physical server and the particular port is opened. A second polling request for information about the topic, directed to the particular port, is obtained from the client. The second polling request is responded to, from the topic server on the physical server, with a message to the client including the updated information about the topic.

27 Claims, 15 Drawing Sheets

FIG. 11

| | REQUESTS/SEC | PKTS/SEC IN | PKTS/SEC OUT | KB/SEC IN | KB/SEC OUT |
|---|---|---|---|---|---|
| BASELINE | 0 | 0 | 0 | 2.5 | 2 |
| FULL ROUND-TRIP | 4750 | 9500 | 14500 | 1300 | 7500 |
| CONNECTION REFUSED | 5100 | 10000 | 250 | 700 | 13 |

| | USER CPU | SYSTEM CPU | JETTY CPU |
|---|---|---|---|
| BASELINE | 3% | 3% | 0.20% |
| FULL ROUND-TRIP | 11% | 21% | 70% |
| CONNECTION REFUSED | 3% | 10% | 0 |

LIGHTWEIGHT POLLING TECHNIQUE

FIELD OF THE INVENTION

The present invention relates generally to communications systems and methods, and, more particularly, to polling techniques and the like.

BACKGROUND OF THE INVENTION

Until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the symbol, for convenience.

Furthermore, Internet access may be provided by many different kinds of networks, in addition to cable or other content-based networks.

One aspect of a communications network is provision of a notification mechanism. Various solutions exist today for notification mechanisms: (1) true messaging, e.g. Java Message Service (JMS)-based; (2) polling; and (3) COMET-based solutions, including long polling and web sockets. The skilled artisan will appreciate that COMET refers to a web application model in which a long-held HTTP request allows a web server to push data to a browser, without the browser explicitly requesting it.

An Internet-scoped web context is one instance in which a notification message may be desired. In such a context, very little infrastructure is typically deployed in the homes of users—basically, just a browser is typically present.

SUMMARY OF THE INVENTION

Principles of the present invention provide a lightweight polling technique. In one aspect, an exemplary method includes the step of obtaining, at a network layer of a physical server, from a client, during a time when updated information about a topic is unavailable, a first polling request for information about the topic. The first polling request is directed to a particular port. Further steps include responding to the first polling request, from the network layer of the physical server, with a connection refused message; and, in response to updated information about the topic becoming available, launching a topic server on the physical server and opening the particular port. An even further step includes obtaining, at the particular port on the topic server on the physical server, a second polling request for information about the topic, from the client. The second polling request is directed to the particular port. A still further step includes responding to the second polling request, from the topic server on the physical server, with a message to the client including the updated information about the topic.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner on a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments carry out polling in a manner that results in greatly reduced impact on the server side; that is to say, reduction in both bandwidth resources required and CPU resources required.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 11-13 show benefits that may be realized in some embodiments of the invention; it is to be emphasized that these are of a non-limiting and exemplary nature;

DETAILED DESCRIPTION OF PREFERRED EMBODIMENTS

Figure 1:
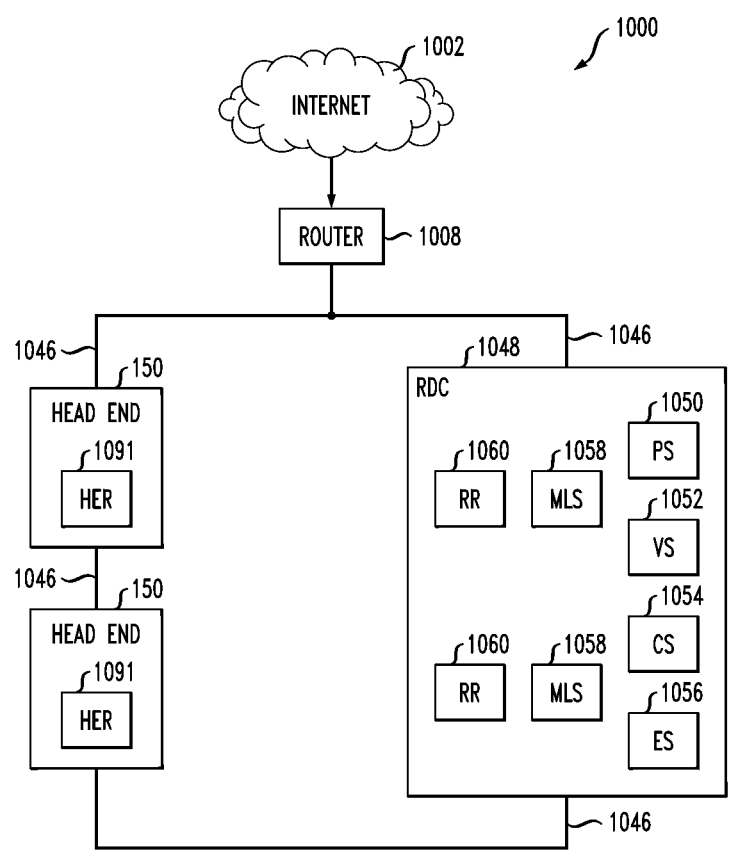
FIG. 1 is a block diagram of an exemplary embodiment of a system, within which one or more aspects of the invention can be implemented.

IP-based data services may be provided over a variety of networks. Purely by way of example and not limitation, embodiments will be shown in the context of a cable multi-service operator (MSO) providing data services as well as entertainment services; note, however, that one or more embodiments are broadly applicable in any client-server context involving polling and are not limited to the particular example(s) shown. FIG. 1 shows an exemplary system 1000, within which one or more aspects of the invention may be implemented. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-5 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
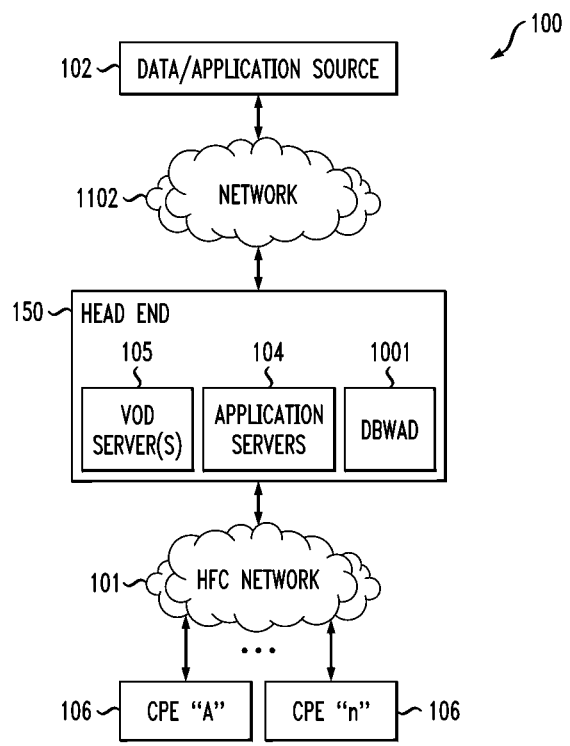
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (vi) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
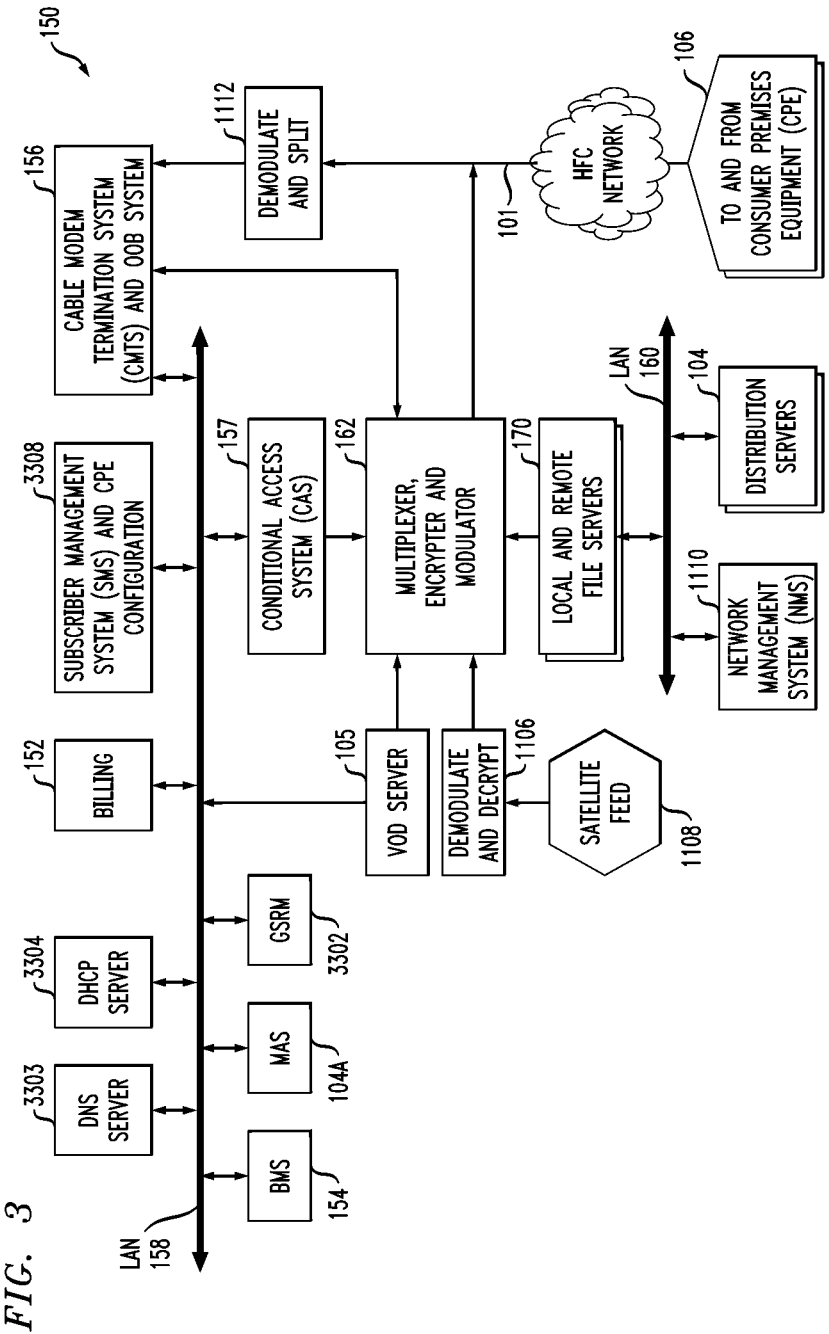
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of network is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups.

In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. The DI-ICP server 3304 could also be located where shown or in different locations.

Figure 4:
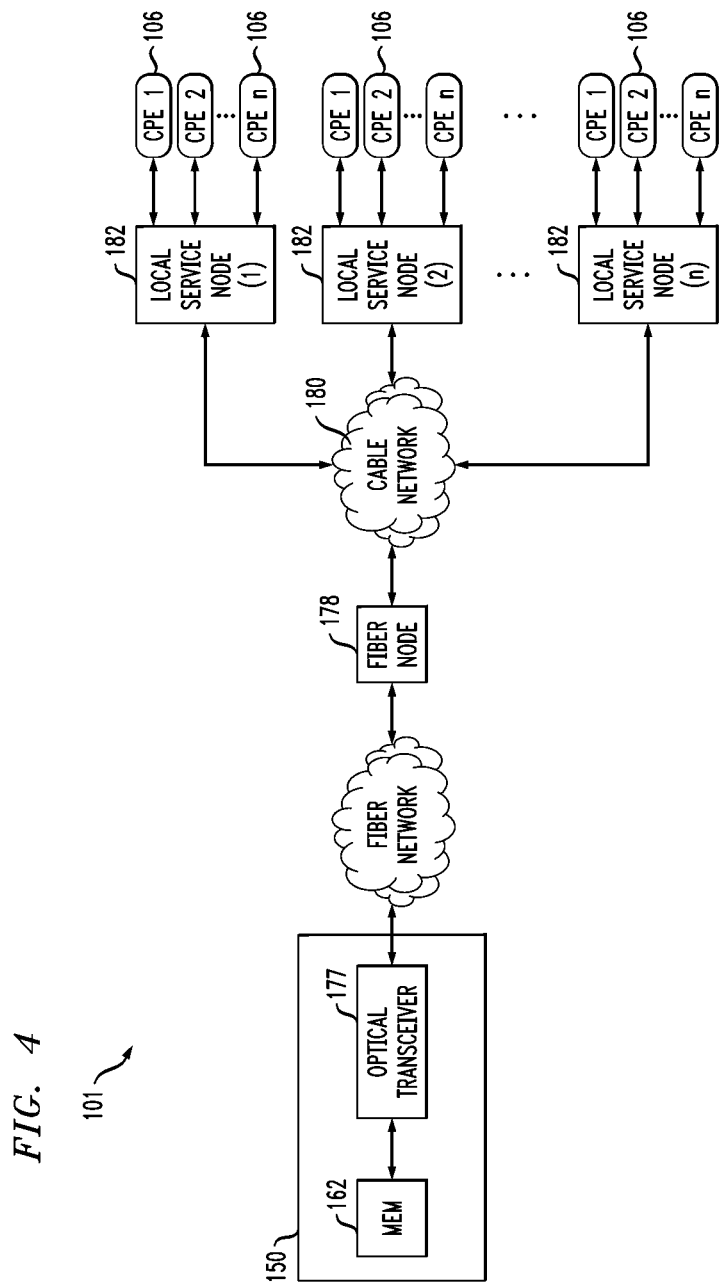
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

Certain additional aspects of video or other content delivery will now be discussed for completeness, it being understood that embodiments of the invention have broad applicability to IP data communications and transport. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
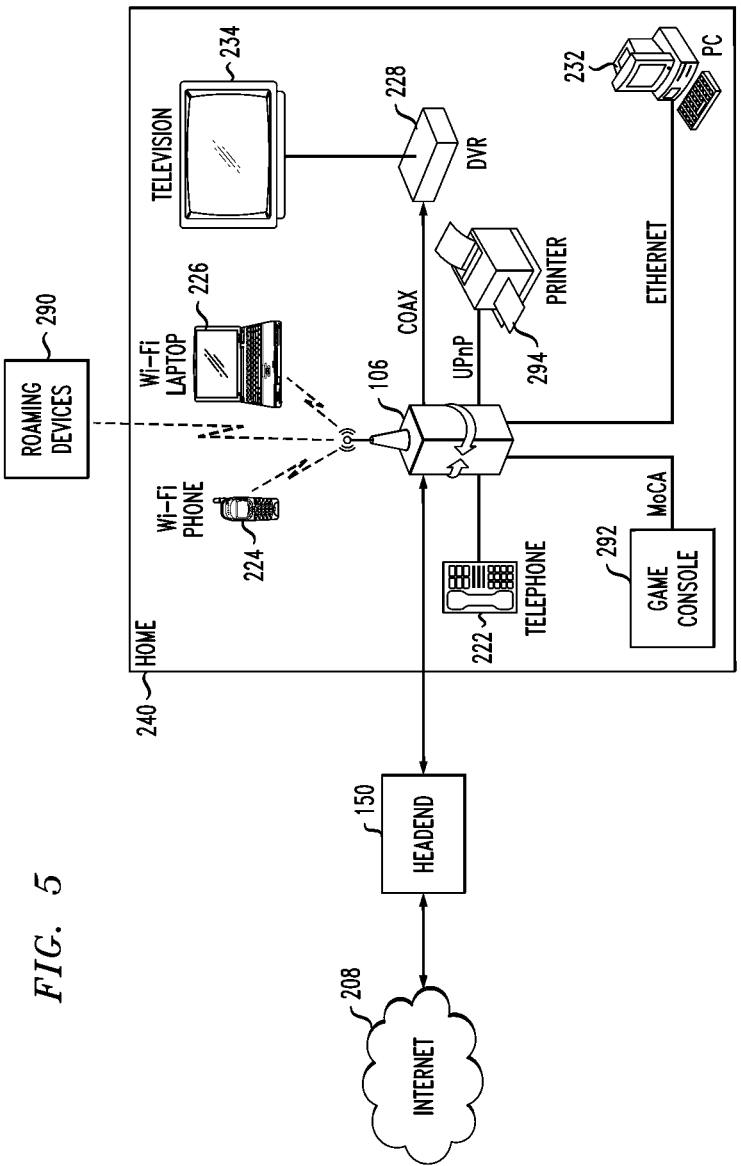
FIG. 5 is a functional block diagram of a premises network, including an exemplary centralized customer premises equipment (CPE) unit, interfacing with a head end such as that of FIG. 3.
Figure 6:
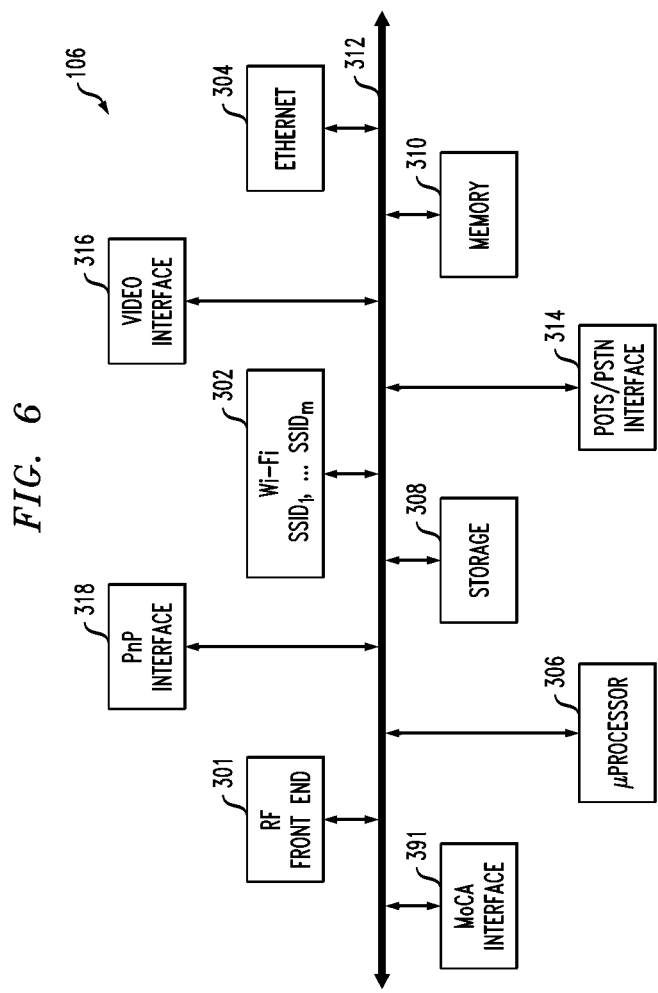
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a simple cable modem or cable modem with a wired or wireless router. Furthermore, many different kinds of clients can connect to many different kinds of application servers over many different kinds of networks such as wired networks, wireless networks, fiber optic networks, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown) (see also example in FIG. 1).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. The CPE 106 may optionally include additional elements and interfaces such as for example an interface for the HomePlug A/V standard which transmits digital data over power lines, a PAN (e.g., 802.15), Bluetooth, or other short-range wireless interface for localized data communication, etc. Yet again, many other types of CPE can be employed in one or more embodiments. Yet further, as noted, many different kinds of clients can connect to many different kinds of application servers over many different kinds of networks such as wired networks, wireless networks, fiber optic networks, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted, various solutions exist today for notification mechanisms—non-limiting examples of same include: (1) true messaging, e.g. JMS-based; (2) polling; and (3) COMET-based solutions, including long polling and web sockets. In an internet-scoped web context, very little infrastructure is typically deployed in the homes of users—often, merely a browser. Advantageously, unlike messaging solutions, one or more embodiments do not require deploying custom software and are thus compatible with typical situations where all that is available in the home of the user is a browser.

Also advantageously, one or more embodiments, unlike COMET-based solutions, are not burdened by obstacles such as connection timeouts, and/or persistent connections on the server-side, which consume resources indefinitely. It is worth noting, in this regard, that web sockets have various pros and cons as compared to use of hypertext transfer protocol (HTTP) as an application protocol (since these are strictly transfer control protocol (TCP) connections). Furthermore, one or more embodiments, unlike current polling solutions, do not suffer from high latencies if the polling frequency is too low, or from scalability problems by making too many requests from the server if the polling frequency is too high—in particular in cases where content is not available "frequently" but low latency is important once a message does appear (e.g. an emergency alert, amber alert, caller ID, etc.).

One or more embodiments advantageously afford a solution that supports low latency without unnecessary demands made on the server.

One or more embodiments provide a lightweight polling technique. One or more instances support frequent polling from clients (web-based or otherwise) and have little if any significant impact on the server performance and/or scalability, supporting an idealized notification system that has low latency, low server demands, no additional installation on clients beyond an assumed browser, ability to leverage all features of HTTP at an application-protocol level and minimal bandwidth consumption. With this mechanism, clients can effectively be notified with very little delay as needed, and servers need not react to any of these polling requests unless and until a meaningful message is in fact available (although the network infrastructure of the server does in fact react to the polling request by catching it upstream and responding with a "connection refused" since the port is not open; thus, it is more precise to state, as to one or more embodiments, that the application server need not react to any of these polling requests unless and until a meaningful message is in fact available).

In one or more embodiments, the client first registers with the server indicating "topics" of interest. For example, the client might want advertisements related to the particular geographic area; advertisements from selected categories (auto, insurance, children's toys, etc.); emergency alert system notifications; caller ID for various in-home phone numbers; and the like. The server responds with a list of URLs, including particular port numbers associated with each topic. The client proceeds to poll against each of these URLs with the frequency desired by the client—e.g. the client may poll for advertisements every 5 minutes, emergency alert system (EAS) messages every 1 minute, caller ID every 3 seconds, and so on—different topics typically call for different polling frequencies. Of course, these values are exemplary and non-limiting; for example, in some instances, EAS messages may be polled for every 15 seconds.

In one or more embodiments, for each topic, the server's response also includes a maximum time frame—clients should preferably not poll with any longer frequencies than this maximum, since that is the maximum time that any legitimate message will be available.

In a large majority of each of the polling requests, the result is "Connection Refused"—since the server has not opened the port in question. That is the case unless and until there actually is a message of relevance for the given topic, at which point the server assembles the message for transport, opens a socket on the port in question, and delivers that message. That particular message will remain available on that port for the initially indicated maximum time. Each unique message will optionally also carry an identifying value (for example, where so-called "reliable messaging" is desirable), which clients should use to confirm that they have not already received that message (in case clients are polling at a frequency that results in more than one poll during the time the given port has the message available). For example, where the optional feature of an identifying value is employed, and a client has been offline for some time, it can look at the identifying value and determine that it has missed one or more messages while offline, and request the server to re-send the missed messages.

At expiration of the maximum time for the message on the given port, the socket supporting that port is closed.

Proof-of-concept testing/simulation discussed further below includes a comparison of impact on the server from a normal poll (which results in a server response and a normal round trip) versus impact on the server from a request against an unavailable port number (i.e. resulting in a "Connection Refused"). In one or more embodiments, upfront development effort is required on the part of the server to support the topic-to-port management, opening and closing of ports, timeouts, security, and so on. In one or more embodiments, an application-level protocol between client and server is provided, as are reusable server-side components, interfaces and application program interfaces (APIs) supporting the necessary server-side development.

Figure 12:
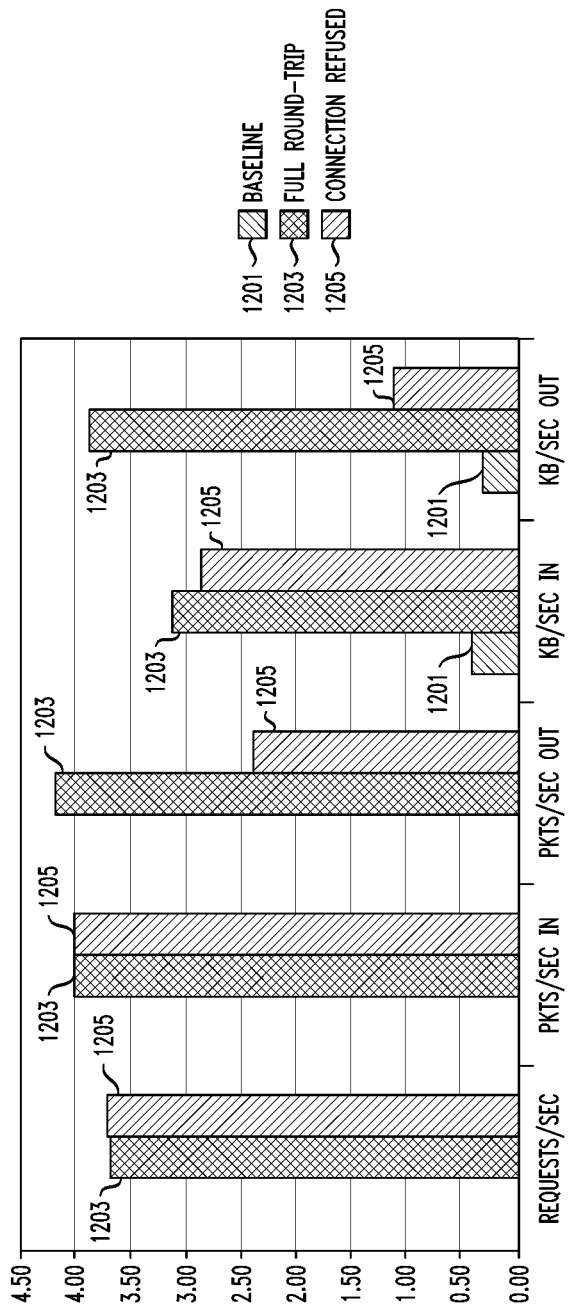
Figure 13:
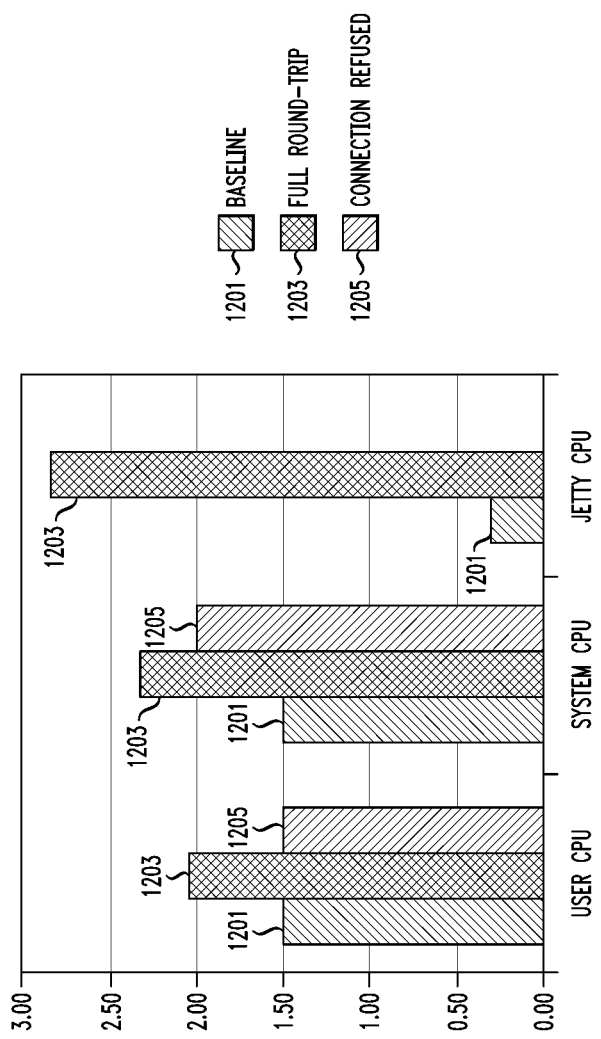

FIGS. 11-13 present estimated magnitudes for various pertinent parameters. Baseline and Full Round Trip cases are based on averaging test data. Connection Refused cases are based on simulations. FIGS. 11-13 show improvements that may be expected in some embodiments. The data is not intended to be limiting; other embodiments may show more or less improvement.

In particular, the "baseline" case in FIG. 11 refers to a quiescent state with no polling activity. The "full round trip"

case refers to traditional request-response polling. The top portion of the table shows network impact and the bottom portion of the table shows CPU impact. In the "full round trip" case there are about 4750 requests per second, 9500 packets per second in, 14,500 packets per second out, 1300 kB per second in, and 7500 kB per second out. This shows a significant increase in network traffic as compared to the quiescent state. Similarly, as compared to the baseline, there is also significant CPU impact. "User CPU" is that portion of the CPU which supports user activity (e.g., applications), as opposed to "system CPU," which supports underlying operating system and network activity. The "Jetty" CPU refers to a web server. The percentages are percentages of the maximum capacity. The first two columns refer to all user CPU and all system CPU. The Jetty CPU column refers to the specific server which is answering the polling requests. The impact of conventional polling is slightly significant (increase from 0.20% to 70%). The "Connection Refused" case shows exemplary data for experiments with techniques in accordance with aspects of the invention, wherein the network layer intercepts polling requests when there is no news. The requests per second and packets per second in are comparable to the conventional polling case. However, the packets per second out, kB per second in, kB per second out, and CPU utilization are significantly reduced as compared to the conventional polling case.

FIGS. 12-13 are logarithmic scales (i.e., the vertical axis in each case is $10^{0.00}$; $10^{0.50}$; $10^{1.00}$; $10^{1.50}$; and so on) and the differences in performance are actually greater than what one would perceive if one thought that the scales in the figures were linear. FIG. 12 shows the network data from the top of FIG. 11 and FIG. 13 shows the CPU data from the bottom of FIG. 11. In FIG. 12, the kB/second out data shows an order of magnitude approaching four for the full round trip and an order of magnitude of about one for the connection refused case. Reference character 1201 is for the baseline; reference character 1203 is for the full round trip; and reference character 1205 is for the connection refused approach.

Figure 15:
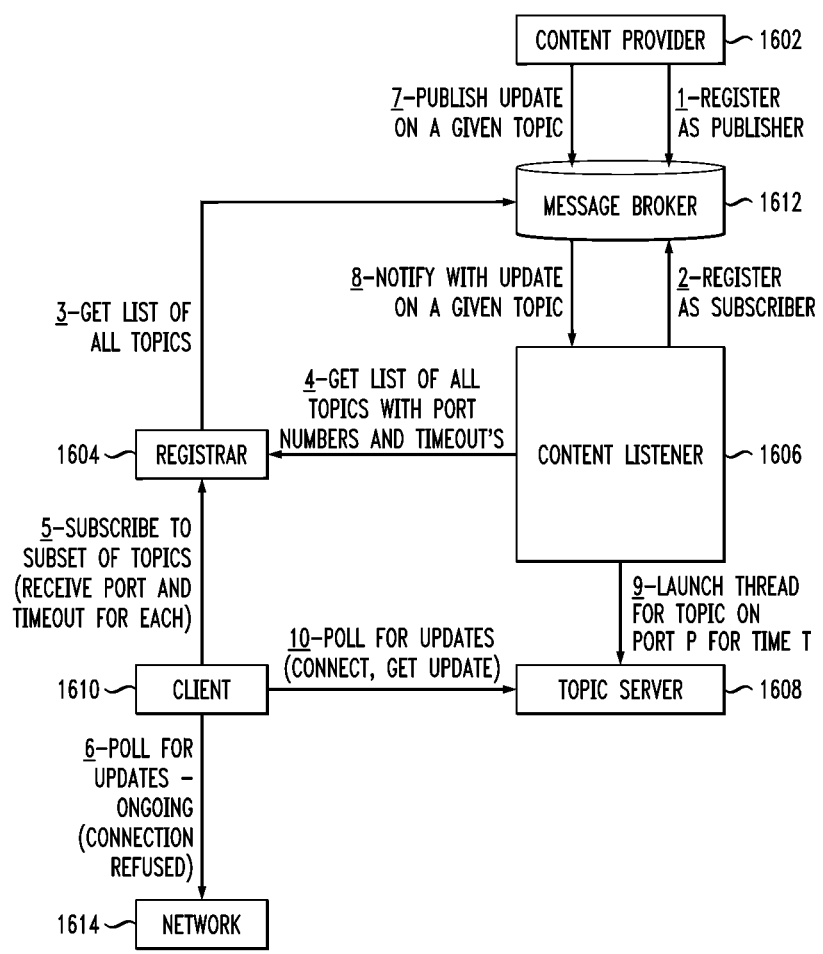
FIG. 15 is an exemplary system block diagram and data flow diagram, in accordance with an aspect of the invention.

One exemplary application of one or more embodiments is to notify a customer that something has happened or is about to happen. Reference should now be had to FIG. 15. The components in FIG. 15, other than the client 1610, typically reside on an application server such as application server 104, but can be on any application server anywhere that is accessible to one or more clients that desire updates, or can be distributed over two or more servers or other computing devices. For example, the content provider 1602 could be external to the application server. Content provider 1602 represents any operational component that generates information to be consumed by interested observers, i.e. each provider manages a given topic with information on that topic published from time to time (for example, a Caller ID system or an emergency alert system). For example, a limited-time promotion to win a tablet computer becomes available ("call within the next 5 minutes!"), and this event information needs to be sent to customers in a timely manner. The content provider for the topic of this particular information (e.g. promotions) sends a message to a notification system with that event. Typically there will be any number of content providers, each managing a different topic (or topics).

The notification system includes a registrar 1604, content listener 1606, and topic server 1608, optionally including an integration queue (e.g., message broker 1612) between the providers 1602 and the listener 1606. The registrar 1604 "knows" about all topics as registered by all content providers 1602, and creates two mappings, one from each topic to a port number and another from each topic to a timeout period. This facilitates making events for the given topic available at a pre-determined location (i.e. port) for a limited period of time. The content listener 1606 fetches these mappings so it can react to notifications from providers 1602 (or indirectly via the integration queue) by hosting each event's information via topic server 1608. The topic server listens on the associated port for the associated amount of time.

The mappings may be maintained in a suitable database, for example, stored in a memory such as memory 730 or the like.

Clients 1610, also referred to as "interested observers" or "subscribers," also fetch these mappings from the registrar 1604, and typically choose a subset that are of interest (e.g. promotions, weather alerts, Twitter® feeds (registered mark of Twitter, Inc., San Francisco, Calif., USA), etc.) against which to poll. The clients 1610 then begin polling against the appropriate ports at a frequency that corresponds, ideally, to the timeout period. Polling at this frequency facilitates receiving each event's information exactly once. Minimizing and preferably eliminating redundant delivery of information can also be facilitated via message numbering; while this approach is very suitable for reliable messaging, it does require a more complex application protocol. Message numbering is optional.

An experimental proof-of-concept prototype has been implemented to demonstrate the content listener 1606, topic server 1608, and clients 1610. Registration of the clients was assumed. Content providers were simulated using another server periodically sending messages to simulate content.

Still referring to FIG. 15, an exemplary operational sequence will now be described. In step 1, content providers 1602 register their topics to be published with a message broker 1612 that acts as an integration queue. In step 2, content listener 1606 registers with the message broker 1612 as a subscriber. In step 3, after all content providers 1602 have registered their topics, the registrar 1604 collects the full list of topics from the message broker 1612; it then maps each one to a port number and timeout value obtained from content listener 1606 in step 4. The content listener 1606 collects the mappings from topic to port number and from topic to timeout. In step 5, clients 1610 request the full list of topics from the registrar 1604 and subsequently send a message to the registrar indicating the subset of topics in which they have an interest; the registrar returns the associated port and recommended polling frequency for each topic in the indicated subset. Clients then begin ongoing polling on each topic-specific port, at the specified polling frequencies.

None of the indicated ports will be open unless and until there is some information to deliver for the given topic; as such, polling requests when pertinent port(s) are closed result in "Connection Refused" as shown at step 6. The "connection refused" message is generated by network layer 1614 on the machine on which the topic server 1608 resides (e.g., an application server). This aspect is advantageous in one or more embodiments—the client 1610 polls as frequently as it needs to, and the server 1608 is not impacted at all by that polling until it has some information to deliver, as the network layer 1614 intercepts the polling messages at other times.

Now consider the case where a content provider 1602 publishes information (referred to as an update) on a given topic, as at step 7. The content listener 1606 receives a notification about that published topic with the payload, as seen at step 8. In step 9, the content listener launches a topic server 1608 in a separate thread (i.e., the topic server runs on the same machine as the content listener (application server)) with information about the topic payload (port, timeout, content). The topic server 1608 reacts by opening the specified port and listening for client polling requests for time T. As seen in step 10, for each subsequent polling request from clients before time T has passed, the topic server delivers the payload. After the specified timeout period has passed, the topic server closes the port and its thread terminates.

Responsibilities of the various components will now be discussed. The registrar 1604 maintains the full list of topics from content providers 1602, and maintains mappings from topic to port number and from topic to timeout value. The content listener 1606 listens for notifications. Notifications include a topic name and the content for that topic. On receipt of a notification on a given topic, the content listener 1606 launches a thread that executes a topic server with port, timeout and content arguments.

The topic server 1608 implements Callable or Runnable, such that an instance can be launched in a thread (Java interfaces which allow a given software component to act as a thread; a thread can be launched with the execution of an implementation of a Java interface which implements Callable or Runnable. Other commands can be used in languages other than Java). On execution within a thread, the topic server 1608 establishes an HTTP server on a given port, for a specified time, serving a given payload of content. The topic server 1608 reacts to any HTTP request by simply delivering the content. At the specified timeout, the topic server 1608 closes the port, preferably by issuing an explicit command.

Appropriate collaborations for one or more exemplary embodiments will now be discussed. The content listener 1606 preferably obtains mappings from the registrar 1604. Notification listening is not restricted to any particular transport protocol. The experimental prototype supports a simple TCP connection. Other schemes could be used in other embodiments. Notifications can be sent directly from content provider 1602 to the content listener 1606; or both content provider and content listener can, for example, be JMS clients, integrated via a JMS broker. In this later arrangement, the provider publishes information and the listener subscribes to that information. In this case, the providers and listener should coordinate on the list of topics. Application protocol (encoding, schema, etc.) is preferably established between content providers and the content listener; for example, as the payload of a direct notification, the JMS message, or the like.

Furthermore in this regard, in one or more embodiments, a JMS broker is used as an integration point. Typically, the providers and listeners do not "know" about each other and thus do not undertake any coordination. This is one of the advantages of an integration point such as a JMS queue, since it decouples providers from listeners. Accordingly, application protocol considerations such as encoding, schema, and the like, do not need to be established. The providers and listeners are simply regarded as clients of the JMS queue and adhere to the protocol, encoding, and the like that have already been established as the standard interface for a JMS type of integration queue. However, JMS is not the only kind of integration queue and other may be employed in other embodiments.

Recommended (but non-limiting) practices for one or more exemplary embodiments will now be discussed. With regard to content listener 1606, application level components such as JMS, Apache Camel™ (mark of the Apache Software Foundation, Forest Hill, Md., USA), and the like are appropriate if the listener is behind a firewall with the content providers 1602; such components provide interfaces and mechanisms that leverage transport protocols and, as such, are higher level abstractions (there is a benefit in the form of more features and better reliability). JMS is less suitable where the listener and providers are separated by a firewall.

Furthermore in this regard, transport protocols such as HTTP, TCP, User Datagram Protocol (UDP), and the like are appropriate if the listener 1606 is deployed remotely from content providers 1602 (for example, HTTP is typically able to penetrate firewalls and is typically allowed to pass at port 80). Recommended deployment in one or more embodiments is use of a JMS queue as an integration point between content providers 1602 and content listener 1606. This decouples the content providers from the content listener. Use of a simple JavaScript Object Notation (JSON) encoding is sufficient, for example:

{"topic": "news", "content": "Here is the latest update"}

With regard to topic server 1608, use of hypertext transfer protocol secure (HTTP/S) is recommended to support web clients. The experimental prototype supports a specialized and narrow subset of HTTP (HTTP is a feature-rich protocol but advantageously all features do not need to be fully implemented in one or more embodiments—for example, in some embodiments, server 1608 does not advertise itself as an HTTP server; it is, however, a specialized network server or network process which listens on HTTP and carries out specialized functionality). Other schemes could be used in other embodiments.

With regard to registrar 1604, the registrar can be launched in a separate thread by the content listener 1606, since the content listener already "knows" how to launch another thread. That thread could, for example, implement Callable or Runnable and then carry out any desired functionality (for example, a lightweight HTTP server). The skilled artisan will appreciate that Callable and Runnable are interfaces in JAVA which can implement desired functionality and allow same to be launched as a thread. In a non-limiting example, the registrar can also support a specialized and narrow subset of HTTP, as needed to minimally perform its function. Other embodiments can use other approaches.

Consider now a non-limiting example of usage. Suppose a customer is watching TV and there is a promotion of some sort—for example, giving away tablet computers—the first 50 callers in the next 5 minutes are eligible for free tablet computers if they answer some survey question or the like. It is desired to allow people watching TV to be notified in a timely manner. One or more embodiments deliver information to the subscribers' TV, mobile device, laptop computers, or the like, at which they are watching TV.

As noted, currently, one technique for notifications includes use of JMS. JMS can notify clients or customers that some information is now available, and deliver it in a timely manner. However, JMS is not a practical solution for clients with Internet-connected TVs, Internet-connected mobile devices, and/or Internet-connected laptops, on which they are watching TV. Furthermore, in the future, there will likely be Internet-based mechanisms for watching TV via a set-top box. While JMS is useful within the enterprise to deliver notifications from a given service to a given collection of listeners, who are the clients or customers, JMS is not really an Internet technology. On the other hand, the aforementioned Internet-connected TVs, Internet-connected mobile devices, and/or Internet-connected laptops (and future Internet-based mechanisms for watching TV via a set-top box) utilize web technologies, and are unsuitable for JMS solutions.

Furthermore in this regard, trying to apply JMS across the Internet does not work because of the need to install additional software on the client side. This becomes impractical in web-based solutions. Instead, on the web, assume that users have a browser and/or something analogous to a browser. So, each of the above-mentioned devices, whether an STB connected to the Internet, or an Internet TV, or a mobile device like a smart phone or a laptop, or even a tablet computer—can be assumed to have good connectivity to the web because they likely have a browser or something that resembles a browser, or otherwise can obtain Internet content through some existing mechanism, without the installation of additional software. This constrains the kind of technology that can be used to publish information, such as the above example regarding the notification that in the next 5 minutes a promotion will occur.

COMET is a way to utilize the existing infrastructure on the Internet, namely, web servers on the server side and web clients on the client side, via a request-response protocol, wherein the client initiates a request and the server provides a response to the request. If the client requests material from the server once every few minutes, this works well, as significant demand is not put on the server because there is not a high frequency of polling taking place. The client just issues a request as needed, on an on-demand basis, whenever the customer is browsing his or her TV and wants to change channels or start a recording or purchase on-demand content. This is what might be called an asynchronous type of event, which is to say that it happens "whenever"—there is no regular schedule for it. For example, the customer simply requests the purchase of an on-demand movie and the server handles same, with little impact on the server side.

Now consider a more demanding set of request-response use cases. For example, consider an emergency alert to notify people that a tornado or flash flood is coming—an MSO or the like wants to be able to notify the people watching TV on their devices in a very timely manner. Here, it is not appropriate to rely on the customer initiating the request; it is necessary to push the information to the customer. In cases like this, consider use of COMET-type technology, where the customer may initiate a request at some point saying, in effect, "advise me when a flash flood is coming." The client waits to be notified; such an event could occur in the next 5 seconds or the next three weeks, or longer. Since the client has issued a request, the request cannot be closed out quickly with a response, because there is nothing to tell the client yet. It is necessary to wait until a flash flood happens to provide a response to close out the request. Therefore, the server holds the request open without responding to it. This is called a "long poll." This is the essence of COMET technology—holding a request open for some undetermined amount of time until there is some information ready to deliver to the client. This works acceptably unless there are a large number of clients, because at that point, on the server side, the server is holding so many connections open that the performance of the server is significantly impacted. In other words, requests come in from a large number of clients, and the server knows there is no flash flood yet, so it holds the requests open for some indefinite amount of time, until a flash flood happens, and then it responds with an appropriate alert. Then, a large number of clients may immediately issue requests again, so they can get updates on the flash flood, or the next alert on something else such as a tornado. Thus, while this technology works, it has a significant impact on the server side because of the need to hold large numbers of requests open in a stateful way. This approach thus becomes less practical; a "brute force" approach is possible by purchasing enough server power to be able to handle the server-side demands, but this is expensive.

Of course, it is theoretically possible that, instead of having the server hold all the requests open, the server could employ a request-response approach as it is designed on the Internet, and simply have each interested client issue a request every 15 seconds or 1 minute, so that the clients can have sufficient timeliness (at most, 1 minute behind in the latter example) about a flash flood or the like on the way. In this approach, a large number of clients all issue requests on, say, a one minute interval and the server has to handle all these requests. This approach works in terms of timeliness for the client (low latency); however, while the clients are all taken care of in terms of timeliness, once again the server suffers a negative impact. A large number of clients issue requests to the server every 15 seconds or one minute. While the server does not need to hold the connections open (i.e., it is not managing statefullness, which has its own level of expense on the server side), instead the server is reacting to each of these large number of requests every 15 to 60 seconds, whatever the interval is, and just indicating that no information is available yet. This goes on until there is something to report.

Figure 8:
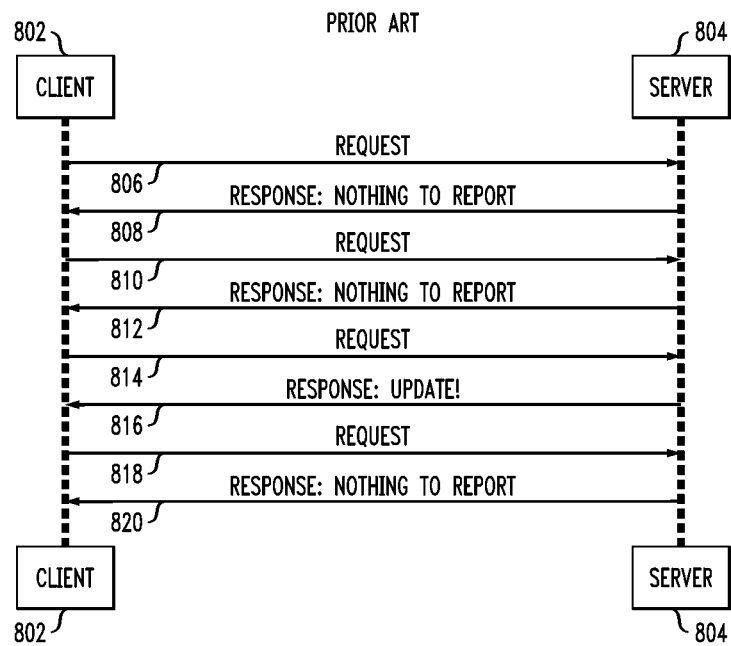
FIG. 8 is a sequence diagram showing a client-side rich user experience (RUI) employing standard polling, as known in the prior art.

This is depicted in FIG. 8. FIG. 8 is a sequence diagram showing a client-side rich user experience in accordance with the prior art (a standard polling mechanism and why it is problematic). Client 802 issues request 806 to server 804, which, as seen at 808, has nothing to report. This is repeated, as shown at 810, 812. Another request is sent at 814; this time, as seen at 816, the server has something to report. The again, there is nothing new to report, at 820, in response to request 818.

This is somewhat less of an impact (and possibly significantly less of an impact) on the server because it does not need to manage a large number of stateful connections. Nevertheless, there is still quite an impact on the server because it needs to answer all of the stateful requests (and typically (perhaps 99.9% of the time), all the server does is to indicate that it has no information for the client). Thus, while this approach is somewhat better in some ways, there is still an inelegant aspect to it—the clients advantageously obtain timely notifications, but the server is still being hit with a large number of polling requests, and for the vast majority of them, the server has no information to hand out. Alerts occur only infrequently.

Figure 9:
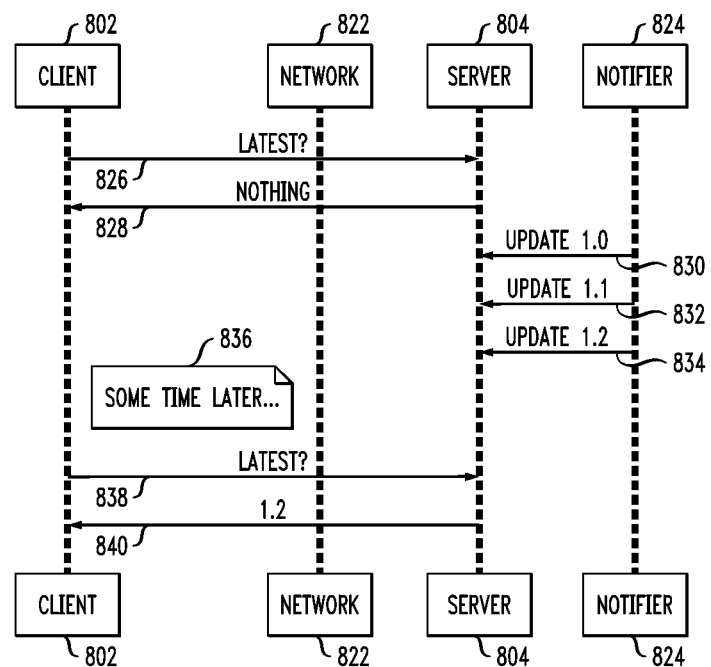
FIG. 9 is a sequence diagram showing server-side impact of the prior art approach of FIG. 8 (multiple "nothing to report" responses are typical but only a few are shown to avoid clutter)

FIG. 9 is a sequence diagram elaborating on certain issues with the prior art approach of FIG. 8. Network 822 and notifier 824 are added to this figure. As seen in FIG. 9, if the frequency of client queries is paired back, it helps the server side but the client may miss one or more pertinent updates (here, Update 1.0 and Update 1.1). That is to say, in standard polling, the client may not receive update information in a timely manner. In particular, the client sends a query at 826 and is advised at 828 that there is nothing new. To reduce the burden on the server side, another query is not sent until 838, which, as indicated at 836, is some time later. In the interim, as shown at 830, 832, 834, there have been three updates, namely update 1.0, update 1.1, and update 1.2. Because of the delay in polling between 826 and 838, the client missed updates 1.0 and 1.1, obtaining only Update 1.2 at 840.

These issues are addressed in one or more embodiments of the invention.

In a non-limiting example, the clients are deployed on STBs, mobile devices such as smart phones or tablets, laptop computers, desktop computers, video game consoles, or the like; indeed, on any kind of device with browser capability; and the server is in a head end (or elsewhere) in an MSO's network (however, the server could be anywhere where an IP connection to one or more clients is available—one or more embodiments are independent of the location of the clients and the server). One or more embodiments advantageously provide a lightweight polling system which preserves the timeliness that the client experiences. One or more embodiments allow the client to ask for information as often as needed or desired, without the need to employ JMS technology in an inappropriate environment, and without the need to employ the so-called long poll or COMET approach (excess server-side capacity which most of the time carries out no work), while preserving a low latency experience for the client and simultaneously minimizing the impact on the server. Advantageously, one or more embodiments reduce impact on the server, down to an almost negligible amount, while maintaining low latency on the client side.

Figure 10:
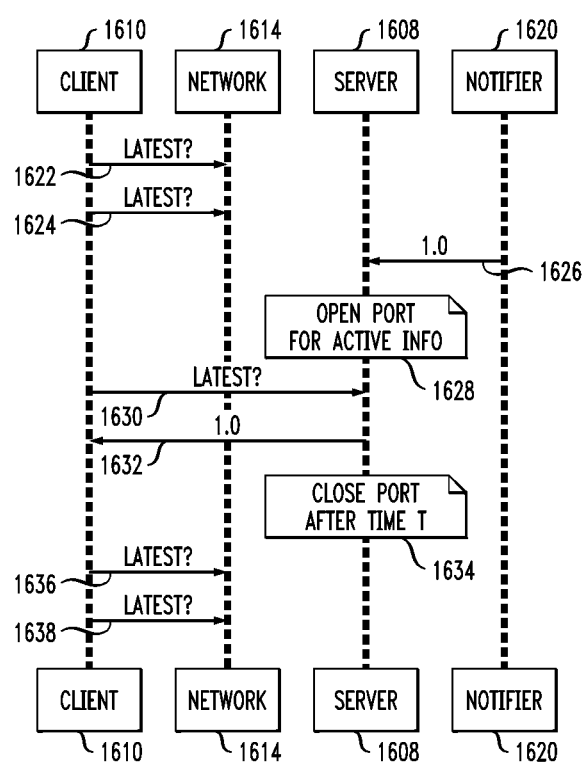
FIG. 10 shows a sequence diagram, in accordance with an aspect of the invention.

FIG. 10 is a sequence diagram in accordance with an aspect of the invention. Note client 1610, network layer 1614, and server 1608 as discussed with regard to FIG. 15. One non-limiting example of a notifier 1620 includes registrar 1604, content listener 1606, and topic server 1608, of FIG. 15. In particular, FIG. 10 shows what happens when the network 1614 refuses the connection because the port in question is closed until the server is notified from a back-end service referred to as notifier 1620 that there is some information available. At that point, the server opens the pertinent port, delivers the information to the next client that asks for it, and after some predetermined time period, closes the pertinent port again. With reference to the figure, at 1622 and 1624, the client requests updates but there are none to report so the network simply refuses the connection. At 1626, the notifier advises the server of an update. As seen at 1628, the server then opens the pertinent port. The next client query, at 1630, proceeds to the server and update 1.0 is provided in response. After a predetermined time T, the port closes again, as seen at 1634. Following that, at 1636 and 1638, the client requests updates but there are none to report so the network simply refuses the connection.

Consider a client sending a request to the server every 15 seconds. In one or more embodiments, there is no negative impact to the server because the server is not listening. A "door" analogy may be helpful: the client "knocks on the door" every 15 seconds but the server does not open the door, or even put a door in place for the client to knock on. The client thinks it is knocking on a door but there is no door because the network intercepts the request and indicates that the requested port is not open, as at 1622, 1624, and 1636, 1638. For example, the server may indicate that if it is desired to receive alerts about flash floods, requests should be sent to a certain IP address and port number. The IP address is the way to identify the location on the Internet for a given server, and unlike the MAC address, can change when the network re-configures. The server can open up an integer number of ports. The port is a finer-grained way of addressing how to communicate over the Internet to the server. The server might expose various services, such as e-mail, FTP, Internet—dozens or hundreds of different services. Each is hosted on a different port number. The standard port for HTTP is port 80. It is referred to as a "well-known port" because everyone agrees that it is the port number for that particular protocol. Use of port 80 is not mandatory. A web server can be placed on any port number. A port number is a 16-bit unsigned integer, thus ranging from 0 to 65535. Ports 1-1024 are reserved for system level services. Ports above that range can be exposed for application level services; for example, some application that it is desired to host that serves television over the Internet. Different port numbers are used for different services and they are all isolated from each other. As far as one service is concerned, it is unaware of any other service. A port number is not interfered with, and can operate as if it "owns" the network for the particular type of service, because the port number establishes the connection.

The skilled artisan will appreciate that the ports are logical ports. In one or more embodiments, there is a layer (network layer) which resides on the computer, and which manages items related to communication from the computer to other computers on a different part of the Internet. The network layer is a software layer which manages the ports and exposes them. The network layer allows configuration and management of the ports by allowing services to bind to a given port number.

By way of an example, clients desiring notification of flash floods may be advised to inquire on port 900, once every minute, to ensure timely information. The skilled artisan will appreciate that in this case, "900" is an exemplary port number and not a reference number in the figures. Client software simply issues a request every 60 seconds against port 900 and in that way if there is a flash flood the subscriber will know about it within a minute. On the server side, there is a service which will issue notifications about flash floods; significantly, this service does not open port 900 for the client to connect to. The network intercepts the request for the client, asking for port 900, and it replies "connection refused." The client asks again after the predetermined interval, say in 15 seconds or one minute. The network intercepts this request, again responds with "connection refused," and the request never reaches the server. Thus, one or more embodiments leverage the network layer to offload the work and leave the server to take care of other activity. Advantageously, in one or more embodiments, application level servers are able to take care of necessary business without being burdened with a large amount of polling. The network layer intervenes and refuses the connection unless and until there is a flash flood or other occurrence that is the subject of an alert, at which time port 900 is open and the network now recognizes that port 900 is open and so passes the request through to the service because the service has now done a binding to port 900. Thus, the client now obtains information regarding the flash flood or other event.

To summarize, every predetermined amount of time (e.g., 15 seconds or 60 seconds), clients ask for information regarding flash floods or other alerts, but they obtain the information only when there is actually a flood or other event. If there is any reason to update the content, or remove the content because it is no longer valid, the service on the application side carries out such update or removal, and once again, clients will "knock on the door" of the server but there will be "nobody home" because "nobody is listening." That is, the network layer will simply respond with "connection refused." Thus, one or more embodiments preserve low latency on the client side and very low demand on the server side.

As discussed above, FIG. 11-13 show non-limiting exemplary benefits that may be realized in some embodiments of the invention.

Figure 14:
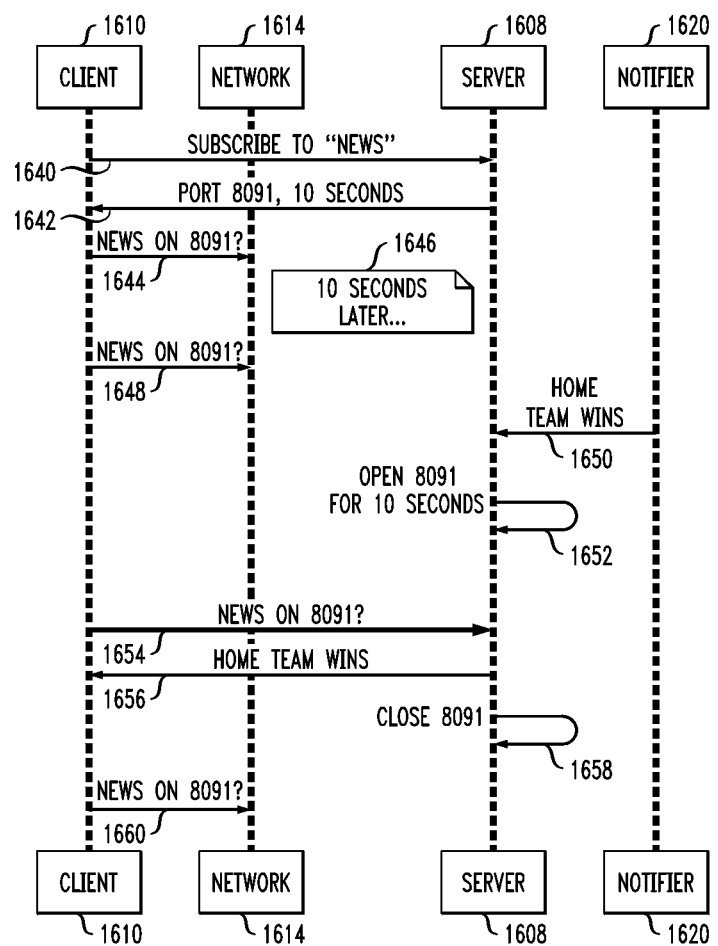
FIG. 14 is a sequence diagram of an exemplary embodiment of the invention.

FIG. 14 is a sequence diagram of an exemplary embodiment of the invention, showing that the client 1610 subscribes to a given topic (here, "news") at 1640, and is told at 1642 what port to listen on and how frequently to query (here, port 8091 every 10 seconds). As seen at 1644, 1646, and 1648, the client inquires for news every 10 seconds, but if there is nothing available to report, simply receives a "connection refused" from network 1614. At 1650, the notifier 1620 advises the server 1608 of an available news item "home team wins." Now, port 8091 on server 1608 is opened for ten seconds (for example) as seen at 1652. The next time the client 1610 queries for news, at 1654, it receives a notification 1656 from server 1608 that the home team has won. As seen at 1658, after 10 seconds (for example), the port 8091 closes again and then request 1660 will be met with a "connection refused."

Given the discussion thus far, it will be appreciated that, in general terms, an exemplary method, according to an aspect of the invention, includes the step 1644 of obtaining, at a network layer 1614 of a physical server, from a client 1610, during a time when updated information about a topic is unavailable, a first polling request (as seen at 6 in FIG. 15) for information about the topic. The first polling request is directed to a particular port. This step can be implemented, for example, by network layer 1614. An additional step (see 6 in FIG. 15) includes responding to the first polling request, from the network layer of the physical server, with a connection refused message. This step can also be implemented, for example, by network layer 1614. In response to updated information about the topic becoming available, as seen at 1650 and step 8 in FIG. 15, an additional step includes launching a topic server 1608 on the physical server and opening the particular port. This step can be implemented, for example, by content listener 1606 and topic server 1608. An even further step, as seen at 1654 and step 10 in FIG. 15, includes obtaining, at the particular port on the topic server on the physical server, a second polling request for information about the topic, from the client. The second polling request is directed to the particular port. This step can be implemented, for example, by network layer 1614 and topic server 1608. Yet a further step includes responding to the second polling request, from the topic server on the physical server, with a message to the client including the updated information about the topic, as seen at 1656. This step can be implemented, for example, by topic server 1608.

In some cases, as seen at 1652, the second polling request is obtained during a first predetermined time after the updated information about the topic is available. This saves server capacity. In some such cases, as seen at 1658, a further step includes closing the particular port after a second predetermined time (preferably the same as the first predetermined time) has elapsed. This step can be implemented, for example, by topic server 1608.

In some instances, as seen at 1642, a further step includes, as part of an initial registration process, advising the client of the particular port. This step can be implemented, for example, by registrar 1604. Still referring to 1642, in some such instances, a further step includes, as part of the initial registration process, advising the client of a polling time interval.

It is worth noting that block 1608 in FIG. 14 represents topic server software running on a physical machine, and that notifier block 1620 in FIG. 14 represents content provider 1602 or message broker/integration queue 1612.

As noted, it is preferred that in the step of advising the client of the polling time interval, the polling time interval is no greater than the second predetermined time.

In some instances, an additional step includes obtaining a registration request from the client. In such instances, the advising of the client is in response to the registration request. Refer to step 1640. This step can be implemented, for example, by registrar 1604. In some such instances, further steps include establishing interconnections with a plurality of content providers, as seen at 1 in FIG. 15 (e.g., using optional message broker 1612); and monitoring for updated content from the content providers, as seen at 7, 8 in FIG. 15 (e.g., using content listener 1606 and optionally message broker 1612). It should be noted that some embodiments may have only a single content provider. The launching of the topic server and the opening of the particular port are, in such cases, in response to the updated content being available from a corresponding one of the content providers. See step 9 following step 8 in FIG. 15; see steps 1650, 1652.

In another aspect, an apparatus 700 includes a memory 730; and at least one processor 720, coupled to the memory, and operative to carry out or otherwise facilitate performance of any one, some, or all of the aforementioned method steps. In some instances, the apparatus includes a plurality of distinct software modules, each embodied on a non-transitory computer-readable storage medium. For example, the modules may include a network layer module, a topic server module, and a content listener module.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a non-transitory manner in a tangible computer-readable recordable storage medium (or multiple such media). Appropriate interconnections via bus, network, and the like can also be included.

Figure 7:
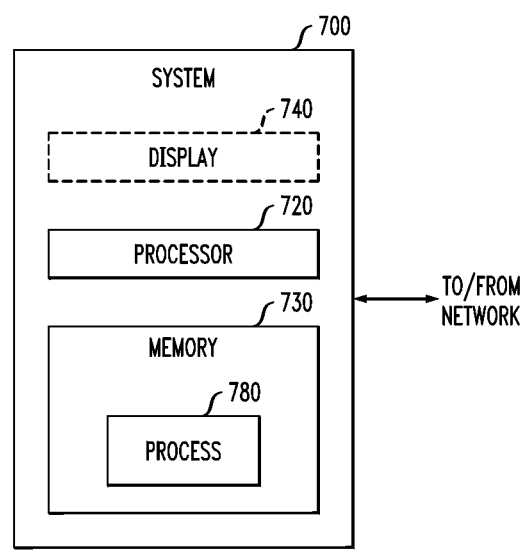
FIG. 7 is a block diagram of a computer system useful in connection with one or more aspects of the invention.

FIG. 7 is a block diagram of a system 700 that can implement at least some aspects of the invention, and is representative, for example, of one or more of the servers discussed elsewhere herein. As shown in FIG. 7, memory 730 configures the processor 720 to implement one or more methods, steps, and functions described herein (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a processor, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on one or more server(s) implementing one or more of blocks 1602, 1604, 1606, 1608, 1612, 1614, 1620, and the like, and/or on one or more clients 1610, and that such program may be embodied on a tangible computer readable recordable storage medium. As used herein, a "server" can refer to a piece of server software or a physical data processing system (for example, system 700 as shown in FIG. 7) running one or more pieces or server software, the usage intended will be apparent to the skilled artisan from the context. The terminology "physical server" refers to a machine with at least one processor and a memory coupled thereto, and optionally with other components, such as is shown in FIG. 7, for example. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules to implement blocks 1602, 1604, 1606, 1608, 1610, 1612, 1614, 1620) (of course, at least the client is on a different machine than the other components). Some embodiments include at least a network layer module to implement network layer 1614, a topic server module to implement topic server 1608, and a content listener module to implement content listener 1606. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, at a network layer of a physical server, from a client, during a time when updated information about a topic is unavailable, a first polling request for information about said topic, said first polling request being directed to a particular port;
   responding to said first polling request, from said network layer of said physical server, with a connection refused message;
   in response to updated information about said topic becoming available, launching a topic server on said physical server and opening said particular port;
   obtaining, at said particular port on said topic server on said physical server, a second polling request for information about said topic, from said client, said second polling request being directed to said particular port; and
   responding to said second polling request, from said topic server on said physical server, with a message to said client including said updated information about said topic.

2. The method of claim 1, wherein said second polling request is obtained during a first predetermined time after said updated information about said topic is available.

3. The method of claim 2, further comprising closing said particular port after a second predetermined time has elapsed.

4. The method of claim 3, further comprising, as part of an initial registration process, advising said client of said particular port.

5. The method of claim 4, further comprising, as part of said initial registration process, advising said client of a polling time interval.

6. The method of claim 5, wherein, in said step of advising said client of said polling time interval, said polling time interval is no greater than said second predetermined time.

7. The method of claim 5, further comprising obtaining a registration request from said client, wherein said advising of said client is in response to said registration request.

8. The method of claim 7, further comprising:
   establishing interconnections with a plurality of content providers; and monitoring for updated content from said content providers;
wherein said launching of said topic server and said opening of said particular port are in response to said updated content being available from a corresponding one of said content providers.

9. The method of claim 1, further comprising providing a system, wherein the system comprises distinct software modules, each of the distinct software modules being embodied on a non-transitory computer-readable storage medium, and wherein the distinct software modules comprise a network layer module, a topic server module, and a content listener module;
wherein:
said obtaining of said first polling request is carried out by said network layer module executing on at least one hardware processor;
said responding to said first polling request is carried out by said network layer module executing on said at least one hardware processor;
said launching of said topic server is carried out by said content listener module and said topic server module executing on said at least one hardware processor;
said obtaining of said second polling request is carried out by said network layer module and said topic server module executing on said at least one hardware processor; and
said responding to said second polling request is carried out by said topic server module executing on said at least one hardware processor.

10. A computer program product comprising a non-transitory computer readable storage medium having computer readable program code embodied therewith, said computer readable program code comprising:
computer readable program code configured to obtain, at a network layer of a physical server, from a client, during a time when updated information about a topic is unavailable, a first polling request for information about said topic, said first polling request being directed to a particular port;
computer readable program code configured to respond to said first polling request, from said network layer of said physical server, with a connection refused message;
computer readable program code configured to, in response to updated information about said topic becoming available, launch a topic server on said physical server and opening said particular port;
computer readable program code configured to obtain, at said particular port on said topic server on said physical server, a second polling request for information about said topic, from said client, said second polling request being directed to said particular port; and
computer readable program code configured to respond to said second polling request, from said topic server on said physical server, with a message to said client including said updated information about said topic.

11. The computer program product of claim 10, wherein said second polling request is obtained during a first predetermined time after said updated information about said topic is available.

12. The computer program product of claim 11, further comprising computer readable program code configured to close said particular port after a second predetermined time has elapsed.

13. The computer program product of claim 12, further comprising computer readable program code configured to, as part of an initial registration process, advise said client of said particular port.

14. The computer program product of claim 13, further comprising computer readable program code configured to, as part of said initial registration process, advise said client of a polling time interval.

15. The computer program product of claim 14, wherein, in said computer readable program code configured to advise said client of said polling time interval, said polling time interval is no greater than said second predetermined time.

16. The computer program product of claim 14, further comprising computer readable program code configured to obtain a registration request from said client, wherein said advising of said client is in response to said registration request.

17. The computer program product of claim 16, further comprising:
computer readable program code configured to establish interconnections with a plurality of content providers; and
computer readable program code configured to monitor for updated content from said content providers;
wherein said launching of said topic server and said opening of said particular port are in response to said updated content being available from a corresponding one of said content providers.

18. An apparatus comprising:
a memory; and
at least one processor, coupled to said memory, and operative to:
obtain, at a network layer of a physical server, from a client, during a time when updated information about a topic is unavailable, a first polling request for information about said topic, said first polling request being directed to a particular port;
respond to said first polling request, from said network layer of said physical server, with a connection refused message;
in response to updated information about said topic becoming available, launch a topic server on said physical server and opening said particular port;
obtain, at said particular port on said topic server on said physical server, a second polling request for information about said topic, from said client, said second polling request being directed to said particular port; and
respond to said second polling request, from said topic server on said physical server, with a message to said client including said updated information about said topic.

19. The apparatus of claim 18, wherein said second polling request is obtained during a first predetermined time after said updated information about said topic is available.

20. The apparatus of claim 19, wherein said at least one processor is further operative to close said particular port after a second predetermined time has elapsed.

21. The apparatus of claim 20, wherein said at least one processor is further operative to, as part of an initial registration process, advise said client of said particular port.

22. The apparatus of claim 21, wherein said at least one processor is further operative to, as part of said initial registration process, advise said client of a polling time interval.

23. The apparatus of claim 22, wherein said polling time interval, said polling time interval is no greater than said second predetermined time.

24. The apparatus of claim 22, wherein said at least one processor is further operative to obtain a registration request from said client, wherein said advising of said client is in response to said registration request.

25. The apparatus of claim 24, wherein said at least one processor is further operative:
- to establish interconnections with a plurality of content providers; and
- to monitor for updated content from said content providers;
- wherein said launching of said topic server and said opening of said particular port are in response to said updated content being available from a corresponding one of said content providers.

26. The apparatus of claim 18, further comprising a plurality of distinct software modules, each of the distinct software modules being embodied on a non-transitory computer-readable storage medium, and wherein the distinct software modules comprise a network layer module, a topic server module, and a content listener module;
wherein:
- said at least one processor is operative to obtain said first polling request by executing said network layer module;
- said at least one processor is operative to respond to said first polling request by executing said network layer module;
- said at least one processor is operative to launch said topic server by executing said content listener module and said topic server module;
- said at least one processor is operative to obtain said second polling request by executing said network layer module and said topic server module; and
- said at least one processor is operative to respond to said second polling request by executing said topic server module.

27. An apparatus comprising:
means for obtaining, at a network layer of a physical server, from a client, during a time when updated information about a topic is unavailable, a first polling request for information about said topic, said first polling request being directed to a particular port;
means for responding to said first polling request, from said network layer of said physical server, with a connection refused message;
means for, in response to updated information about said topic becoming available, launching a topic server on said physical server and opening said particular port;
means for obtaining, at said particular port on said topic server on said physical server, a second polling request for information about said topic, from said client, said second polling request being directed to said particular port; and
means for responding to said second polling request, from said topic server on said physical server, with a message to said client including said updated information about said topic.

\* \* \* \* \*